United States Patent
Kwatra et al.

(10) Patent No.: US 11,657,607 B2
(45) Date of Patent: May 23, 2023

(54) NON-INTRUSIVE IMAGE IDENTIFICATION

(71) Applicant: INTERNATIONAL BUSINESS MACHINES CORPORATION, Armonk, NY (US)

(72) Inventors: Shikhar Kwatra, San Jose, CA (US); Zachary A. Silverstein, Austin, TX (US); Frank Eduardo Chávez Malpartida, Lima (PE); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 17/097,993

(22) Filed: Nov. 13, 2020

(65) Prior Publication Data
US 2022/0156495 A1    May 19, 2022

(51) Int. Cl.
*G06V 20/10*    (2022.01)
*G06F 16/22*    (2019.01)
(Continued)

(52) U.S. Cl.
CPC .......... *G06V 20/10* (2022.01); *G06F 16/2272* (2019.01); *G06F 18/21* (2023.01);
(Continued)

(58) Field of Classification Search
CPC .... G06V 20/10; G06V 10/70; G06V 2201/10; G06F 16/2272; G06F 16/55;
(Continued)

(56) References Cited

U.S. PATENT DOCUMENTS 9,021,045 B2 *  4/2015  Pennington ............ G06Q 10/10
                                                   709/212
9,152,849 B2 * 10/2015  Ganong ................. G06V 20/30
(Continued)

FOREIGN PATENT DOCUMENTS

CN        101547162 A    9/2009

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Javier O Guzman
(74) *Attorney, Agent, or Firm* — Cuenot Forsythe & Kim, LLC (57) ABSTRACT

Non-intrusive image identification includes acquiring an image and connectivity data at a network-connected computing node via a data communications network. The image is captured by an image-capturing device remotely located from the computing node. The connectivity data is associated with one or more devices located within a predetermined vicinity of the image-capturing device. Connectivity data can be correlated with electronically stored networking data associated with the one or more devices to determine an identity of one or more device users. The correlating includes electronically searching one or more network-connected sources of networking data and, based on the connectivity data, matching the one or more devices to the one or more device users. Image-tagging data corresponding to one or more selected individual device users is generated, and the image is tagged with the image-tagging data for identifying one or more individuals appearing in the image.

20 Claims, 7 Drawing Sheets

(51) Int. Cl.
  *G06N 20/00* (2019.01)
  *H04L 43/0811* (2022.01)
  *H04L 67/52* (2022.01)
  *G06F 18/21* (2023.01)

(52) U.S. Cl.
  CPC .......... *G06N 20/00* (2019.01); *H04L 43/0811* (2013.01); *H04L 67/52* (2022.05)

(58) Field of Classification Search
  CPC .... G06F 16/909; G06K 9/6217; G06N 20/00; H04L 43/0811; H04L 67/52; H04L 67/104; H04L 67/12
  See application file for complete search history.

(56) References Cited

U.S. PATENT DOCUMENTS

| | | | |
|---|---|---|---|
| 10,162,825 B2 | 12/2018 | Garcia | |
| 2008/0126960 A1* | 5/2008 | Naaman | G06F 16/58 |
| | | | 715/764 |
| 2008/0133658 A1* | 6/2008 | Pennington | G06Q 10/10 |
| | | | 709/204 |
| 2008/0195657 A1* | 8/2008 | Naaman | G06V 20/30 |
| 2008/0281919 A1* | 11/2008 | Shamp | G06F 3/14 |
| | | | 709/205 |
| 2010/0278345 A1* | 11/2010 | Alsina | H04W 12/06 |
| | | | 709/227 |
| 2011/0028083 A1* | 2/2011 | Soitis | H04L 67/1095 |
| | | | 455/3.06 |
| 2012/0076367 A1 | 3/2012 | Tseng | |
| 2012/0278387 A1* | 11/2012 | Garcia | G06F 3/0481 |
| | | | 709/204 |
| 2013/0225212 A1 | 8/2013 | Khan | |
| 2014/0086458 A1 | 3/2014 | Rogers | |
| 2014/0280941 A1* | 9/2014 | Maguire | G06Q 50/01 |
| | | | 709/225 |
| 2014/0337341 A1* | 11/2014 | Tseng | G06F 16/48 |
| | | | 707/737 |
| 2015/0036881 A1 | 2/2015 | Sharma et al. | |
| 2016/0255162 A1* | 9/2016 | Frieder | H04W 4/21 |
| | | | 709/204 |
| 2016/0358013 A1 | 12/2016 | Carter et al. | |
| 2018/0285387 A1 | 10/2018 | Rothschild | |
| 2019/0108362 A1* | 4/2019 | Miller | G06Q 20/06 |
| 2019/0215404 A1* | 7/2019 | Stöcker | H04L 12/1467 |

OTHER PUBLICATIONS

"Method to Identify Subjects in A Photo Without Using Facial Recognition Analysis," IP.com Prior Art Database Technical Disclosure, No. IPCOM000236679D, May 8, 2014, 5 pg.

* cited by examiner

302
Acquire image and connectivity data at a network-connected computing node via a data communications network, wherein the image is captured by an image-capturing device remotely located from the computing node, and wherein the connectivity data is associated with one or more devices located within a predetermined vicinity of the image-capturing device

304
Correlate the connectivity data with electronically stored networking data associated with the one or more devices to determine an identity of one or more device users, wherein the correlating comprises electronically searching one or more network-connected sources of networking data and, based on the connectivity data, matching the one or more devices to the one or more device users

306
Generate image-tagging data corresponding to one or more selected individual device users for tagging the image

308
Tag the image with the image-tagging data for identifying one or more individuals appearing in the image

NON-INTRUSIVE IMAGE IDENTIFICATION

BACKGROUND

This disclosure relates to sharing images on social networking and other platforms, and more particularly, to non-intrusively identifying individuals in shared images.

One popular outgrowth of the Internet is social networking through use of social media websites and apps. Social networking allows remotely located users who share common interests to interact from virtually anywhere in the world. One widely used feature of social networking platforms is the sharing of images.

SUMMARY

In one or more embodiments, a method includes acquiring an image and connectivity data at a network-connected computing node via a data communications network, the image being captured by an image-capturing device remotely located from the computing node, and the connectivity data being associated with one or more devices located within a predetermined vicinity of the image-capturing device. The method includes correlating the connectivity data with electronically stored networking data associated with the one or more devices to determine an identity of one or more device users, the correlating including electronically searching one or more network-connected sources of networking data and, based on the connectivity data, matching the one or more devices to the one or more device users. The method includes generating image-tagging data corresponding to one or more selected individual device users and tagging the image with the image-tagging data for identifying one or more individuals appearing in the image.

In one or more embodiments, a system includes a processor configured to initiate operations. The operations include acquiring an image and connectivity data at a network-connected computing node via a data communications network, the image being captured by an image-capturing device remotely located from the computing node, and the connectivity data being associated with one or more devices located within a predetermined vicinity of the image-capturing device. The operations include correlating the connectivity data with electronically stored networking data associated with the one or more devices to determine an identity of one or more device users, the correlating including electronically searching one or more network-connected sources of networking data and, based on the connectivity data, matching the one or more devices to the one or more device users. The operations include generating image-tagging data corresponding to one or more selected individual device users and tagging the image with the image-tagging data for identifying one or more individuals appearing in the image.

In one or more embodiments, a computer program product includes one or more computer readable storage media having instructions stored thereon. The instructions are executable by a processor to initiate operations. The operations include acquiring an image and connectivity data at a network-connected computing node via a data communications network, the image being captured by an image-capturing device remotely located from the computing node, and the connectivity data being associated with one or more devices located within a predetermined vicinity of the image-capturing device. The operations include correlating the connectivity data with electronically stored networking data associated with the one or more devices to determine an identity of one or more device users, the correlating including electronically searching one or more network-connected sources of networking data and, based on the connectivity data, matching the one or more devices to the one or more device users. The operations include generating image-tagging data corresponding to one or more selected individual device users and tagging the image with the image-tagging data for identifying one or more individuals appearing in the image.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to sharing images on social networking and other platforms, and more particularly, to non-intrusively identifying individuals in shared images. As defined herein, "images" includes both still pictures and videos. One aspect of social networking is expanding relationships by linking individuals who though initially strangers to one another have social relationships with a third individual known to both. Not surprisingly, an image may be shared on a social networking site where everyone whose image or likeness is captured in the image is known by the individual who captures the image but not known by others with whom the image is shared. The individual who shares the image can manually tag the image to identify each individual but doing so can be laborious and time consuming. Automated identifying mechanisms such as facial recognition exist but can be off-putting and intrusive to individuals whose images are captured, which can have a chilling effect on this aspect of social networking. Mechanisms such as facial recognition, moreover, are not only intrusive but also give rise to privacy concerns, especially given that indexing and storing facial data may be used to unlock user devices or result in posting intrusive or inappropriate information about individuals with their facial identities.

An aspect of the systems, methods, and computer program products disclosed herein is the non-intrusive, secure tagging of images of individuals. As defined herein, "tagging" is a coupling of identifying information and/or other information specific to one or more individuals whose images are captured in pictures or videos that are uploaded to social or other such networking platforms.

In some arrangements, machine-to-machine (M2M) communication is used to capture connectivity data (e.g., MAC address) of devices (e.g., smartphone, smartwatch, IoT device) within the vicinity of an image-capturing device (e.g., smartphone camera). "Connectivity data," as defined herein, is any unique identifier (UID) or other data that uniquely identifies a device when conveyed to or when discoverable by another device or system. In the present context, connectivity data can be conveyed by a wireless signal (e.g., Wi-Fi, Bluetooth, Airdrop™) emanating from one or more devices in the vicinity of the image-capturing device, which senses the signal and couples the connectivity data conveyed in the signal with the captured image. The connectivity data can by coupled with image metadata and uploaded with the image to a social networking site. The devices may be ones used by individuals to log into a social or other networking service that maintains user profiles that are associated with the devices. Accordingly, there is the likelihood that based on the connectivity data sensed by the image-capturing device, a user associated with the corresponding logged-in device—assuming the device is carried by, worn by, or adjacent to the logged-in user—can be identified in an image.

One aspect of the identifying is using the signal strength of signals broadcast by the user devices and sensed by the image-capturing device. Devices carried by, worn by, or adjacent to users whose images are not captured are likely to be farther removed from the image-capturing device, and the corresponding signals are likely weaker than those broadcast by devices carried by, worn by, or adjacent to users whose images are captured. In another aspect, a corresponding search of social or other networking data can be performed to determine whether an individual associated with a device whose connectivity data is captured has an existing social or other network relationship with the user who captured the image. Such a relationship makes it likely that the individual associated with a device identified by connectivity data does appear in the captured image. In still another aspect, geolocation data generated by devices identified by connectivity data can be used to verify a relationship. If a device whose geolocation data indicates a spatial closeness to the image-capturing device at the time the image was captured is identified as corresponding to an individual who has an existing relationship with the image-capturing device user, then there is a likelihood that the individual associated with the device appears in a captured image.

Another aspect of the systems, methods, and computer program products disclosed herein is a consensual blockchain ledger that limits who can identify individuals based on connectivity data. Only users who have obtained permission to access data contained in the consensual blockchain ledger can identify individuals based on connectivity data securely stored on the consensual blockchain ledger. Still another aspect is the identifying of specific users in images based on which devices the individuals appear in the image to be holding, wearing, or adjacent to. The identifying is performed using a machine learning model (e.g., convolutional neural network) trained to identify objects (devices) appearing in images.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
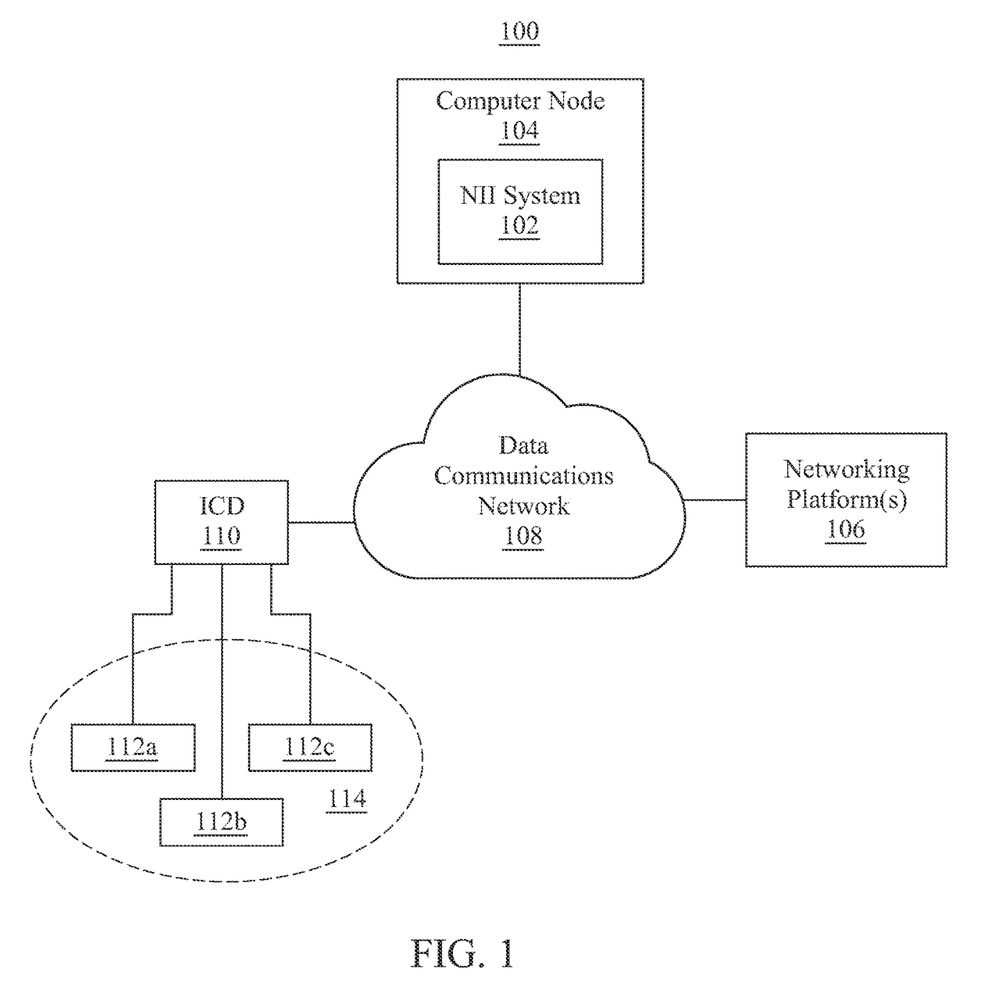
FIG. 1 depicts an example computing environment that includes a non-intrusive image identification system according to an embodiment.
Figure 7:
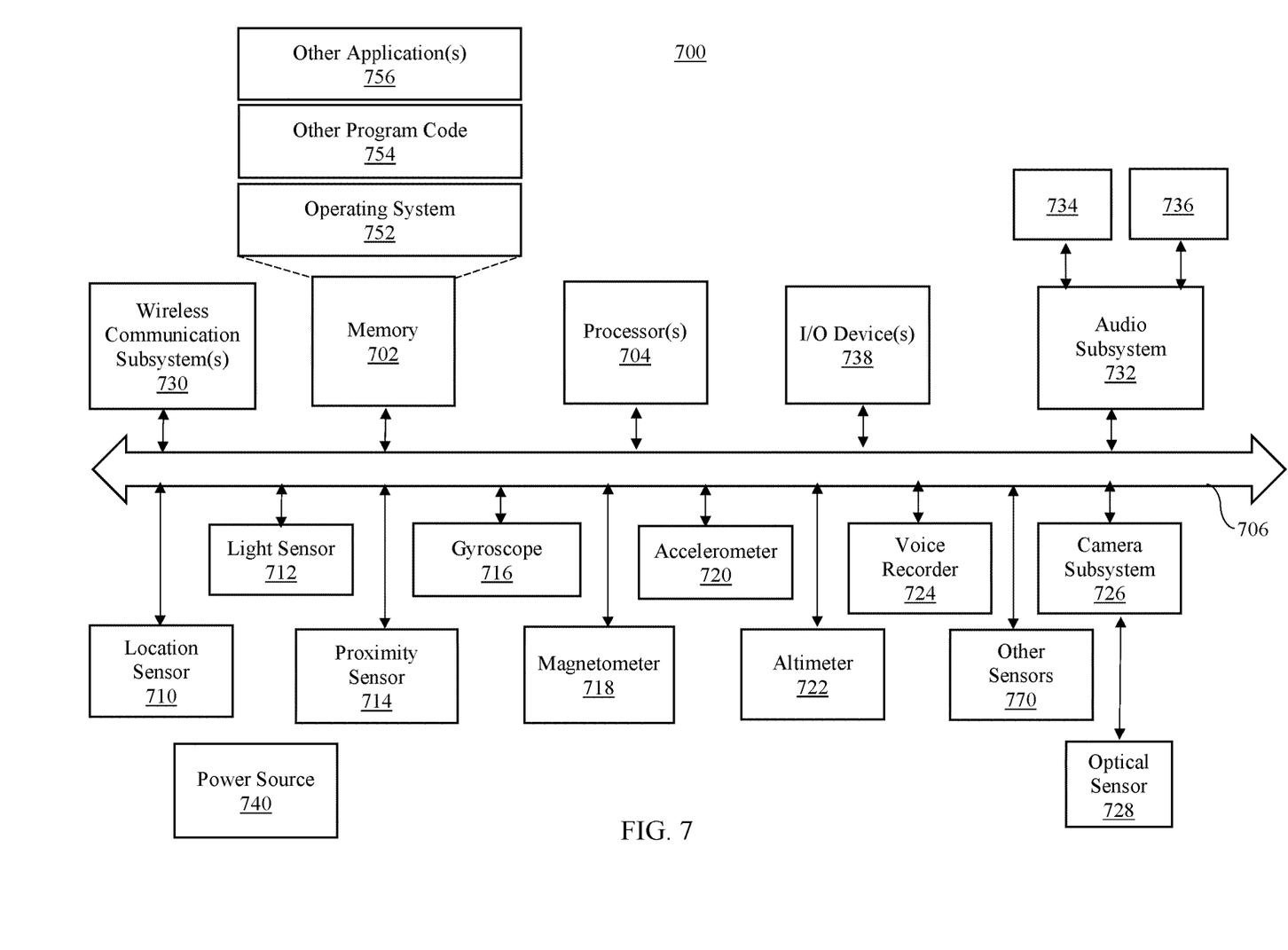
FIG. 7 depicts an example portable device according to an embodiment.

FIG. 1 depicts example computing environment 100, which includes non-intrusive image identification (NII) system 102 according to one embodiment. Illustratively, NII system 102 is implemented in computing node 104. Computing node 104 is communicatively coupled to one or more networking platforms (e.g., social or other networking sites) 106 via data communications network (e.g., Internet) 108. Via data communications network 108, NII system 102 can operatively couple with image-capturing device (e.g., smartphone) 110. Image-capturing device (ICD) 110 illustratively senses signals broadcast by one or more other devices 112a, 112b, 112c within vicinity 114 of image-capturing device 110. Devices 112a-112c can be portable devices that include one or more of the components described with reference to example portable device 700 (FIG. 7). Devices 112a-112c can include devices carried (e.g., smartphone) or worn (e.g., smartwatch) by users or adjacent (e.g., laptop) to the users. The users can log into networking platform(s) 106 using devices 112a-112c. Networking platform(s) 106 can support social networking, business or professional networking, or any of various other types of networking, whereby the platform stores networking data (e.g., identities, interests, work, hobbies, and the like) associated with different individuals.

Figure 6:
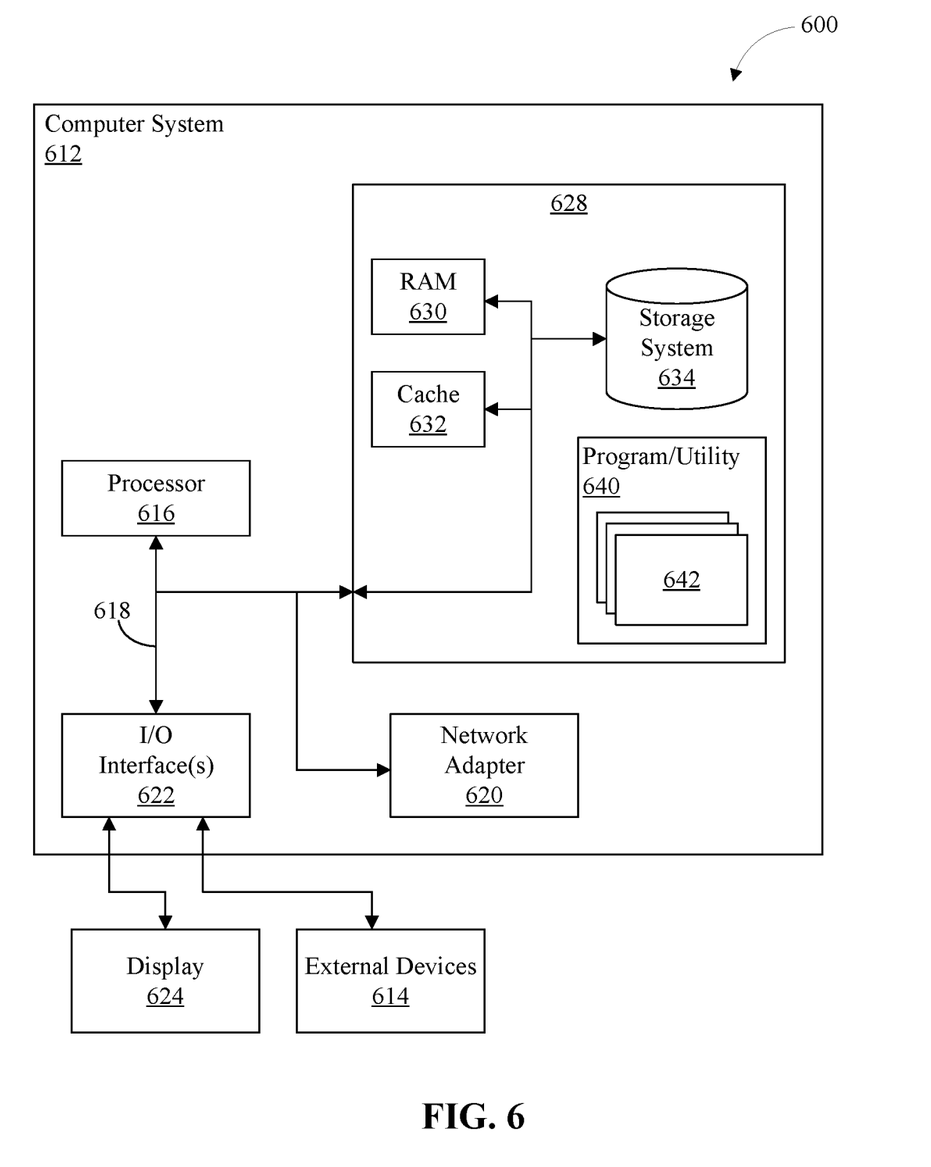
FIG. 6 depicts a cloud computing node according to an embodiment.

NII system 102 is illustratively implemented in software that is stored in memory and executes on one or more processors of a computer system of computing node 104. Computing node 104 can be a server (e.g., cloud-based server) such as computing node 600 (FIG. 6). Computing node 104 can include one or more computer systems, such as computer system 612, whose hardware components include one or more processors 616 and memory 628 (FIG. 6).

Figure 2:
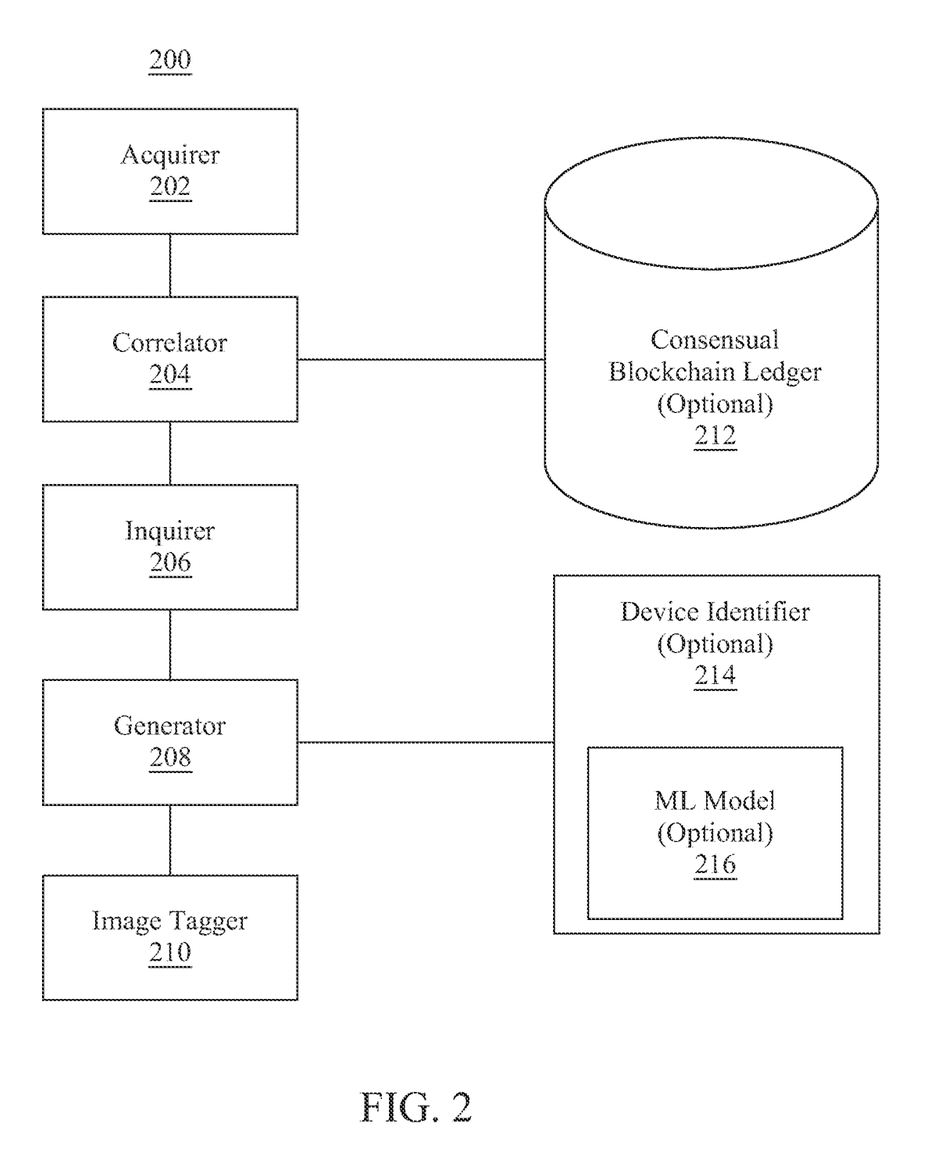
FIG. 2 depicts certain example components of a non-intrusive image identification system according to an embodiment.

Referring additionally to FIG. 2, certain NII components 200 of NII system 102, according to one embodiment, are illustrated. NII components 200 illustratively include acquirer 202, correlator 204, inquirer 206, generator 208, and image tagger 210. In certain embodiments in which NII system 102 is implemented in software, NII components 200 can comprise software modules for performing the functions and operations described herein. In other embodiments, one or more of components 200 can be implemented in hard-wired circuitry or a combination of circuitry and software for performing the functions and operations described herein.

Operatively, images and connectivity data are electronically acquired via data communications network 108 by acquirer 202. The images and connectivity data are uploaded to NII system 102 by ICD 110. ICD 110 can sense wireless signals broadcast by devices 112a-112c that are within vicinity 114 at the time that ICD 110 captures an image. ICD 110 can wirelessly poll devices within vicinity 114. Individuals (not shown) who may or may not be carrying, wearing, or be adjacent to devices 112a-112c may be in vicinity 114. An individual may be holding one of the devices (e.g., smartphone) or wearing one of the devices (e.g., smartwatch). Another individual may be next to or closely adjacent one of the devices. Signals (e.g., Bluetooth, Wi-Fi, Airdrop) broadcast by devices 112a-112c unilaterally or in response to ICD 110 polling enables ICD 110 to convey connectivity data (e.g., MAC address or other UID) of each of the devices.

The connectivity data is captured by ICD 110, uploaded with the image, and conveyed to NII system 102 via data communications network 108. The image can comprise metadata, to which the captured connectivity data can be added. For example, the connectivity data can be added to the header of an image file formatted according to the exchangeable image file format. Alternatively, for example, the connectivity data can be conveyed to NII system 102 separately from, and in parallel with, the image and corresponding metadata. If the connectivity data is conveyed with the image metadata, acquirer 202 extracts the connectivity data upon receiving the image. If the connectivity data is conveyed separately, acquirer 202 records and electronically stores an association of the connectivity data with the received image. Having acquired the connectivity data and image, acquirer 202 obtains the UIDs (e.g., MAC addresses) of devices 112a-112c, and conveys the UIDs to correlator 204.

Users of devices 112a-112c can use the devices to log into a networking service (e.g., social networking service). A corresponding networking platform (e.g., server) can capture the MAC address or other UID of the device used for logging into the networking service. The networking service maintains networking data (e.g., user profile) associated with the UID. Thus, the networking data associated with the UID can be used to identify an individual who possibly appears in an image captured from vicinity 114 by ICD 110. That is, an individual may be the same individual identified by networking data as being associated with a device having a UID captured by ICD 110.

Correlator 204 searches one or more sources of networking data to correlate each UID obtained from acquired connectivity data with networking data associating a particular individual with the device identified by the UID. In some embodiments, NII system 100 is integrated in a networking platform as part of a corresponding networking service (e.g., social networking service). In other embodiments, NII system 100 communicatively couples via a data communications network, such as the Internet, wide area network (WAN), and/or local area network (LAN) through wired and/or wireless connections with one or more networking platforms.

One or more lookup tables can be searched by correlator 204, each lookup table providing a data structure to link device UIDs (e.g., MAC addresses) with networking data (e.g., user profiles) corresponding to individual device users. Every match made by correlator 204 between a UID obtained from acquired connectivity data and an individual identified by networking data associated with the UID is a potential subject of an image.

Not every individual identified based on connectivity data captured by ICD 110 as being associated with a device in vicinity 114 necessarily appears in the image, however. Accordingly, correlator 204 collects the networking data correlated with the connectivity data that identifies a device and a corresponding device user who potentially appears in an image captured by ICD 110 and conveys the data to inquirer 206. Inquirer 206 conveys an inquiry comprising an ordered list of identified individuals via data communications network 108 to the ICD 110 user, who ostensibly knows the actual identities of individuals in the image. The inquiry requests ICD 110 user respond by selecting individuals from the ordered list who appear in the image. ICD 110 user can respond via data communications network 108. Based on the response, generator 208 generates a tag for each individual selected. Image tagger 110 tags the image to identify one or more individuals appearing in the image. Optionally, ICD 110 user can manually tag the image to include the identity of any individual who appears in the image but is not identified by NII system 100.

ICD 110 possibly will sense signals from devices not associated with individuals appearing in the image. For example, vicinity 114 may be within an office, dinning or leisure establishment, or a large social gathering in which numerous individuals are carrying or wearing devices whose broadcast signals are sensed by ICD 110 or which respond to wireless polling by ICD 110. To mitigate the potential for identifying an inordinate number of candidates, NII system 100 in some embodiments obtains from ICD 110 a measure of the signal strength of signals detected by ICD 110. The likelihood that devices that are a predetermined distance from ICD 110 are associated with individuals who appear in the image is correlated with the detected strength of the devices' signals at the time of image capture. Accordingly, NII system 100 limits the selection of candidates to present to ICD 110 user to those individuals determined to be associated with devices that broadcast signals whose strength meets or exceeds a predetermined threshold indicating that the devices are within vicinity 114 and are thus likely associated with an individual who appears in the image.

In other embodiments, the potential for an inordinate number of candidates is mitigated by NII system 100 selecting as candidates only those individuals whose corresponding networking data indicates a predetermined relationship with the ICD 110 user. For example, the relationship can be reflected in whether a candidate and ICD 110 user are designated as "friends" on one or more social networks or the number of "likes" of media shared between the candidate and ICD 110 user exceeds a minimum number of likes. In certain embodiments, NII system can access various social or other networking sites to determine the degree of relationship between the candidate and ICD 110 user and select as candidates only those individuals having a degree of relationship exceeding a minimum degree.

In still other embodiments, the distance between a device and ICD 110 can be determined by geolocation data (e.g., GPS) transmitted from the device and captured at a source of networking data (networking platform). Based on the likelihood that only devices a predetermined distance from ICD 110 are associated with individuals appearing in the image, NII system 100 limits the selection of candidates to those who are associated with devices within a predetermined distance from ICD 110 as determined by the devices' and ICD 110 geolocation data.

Certain device users may be reluctant to allow unlimited identification of their device by broadcasting connectivity data unilaterally or in response to wireless polling if the connectivity data precisely identifies the device's MAC address or other UID. Accordingly, in some embodiments, a group of individuals including ICD 110 user may agree to establish a consensual blockchain ledger to which only members of the group have access. A group member's device only broadcasts or responds to wireless polling by transmitting an anonymity indicator. As defined herein, an "anonymity indicator" corresponds to a device's actual UID, which is electronically stored on the limited-access consensual blockchain ledger. ICD 110 captures the anonymity indicator rather than connectivity data identifying a device. NII system 100 receives the anonymity indicator with the image conveyed by ICD 110 and determines whether the user associated with ICD 110 is permitted access to the information securely stored in consensual blockchain ledger 212. If so, then acquirer 202 acquires from consensual blockchain ledger 212 the electronically stored information that provides the actual identity of the device. NII system 110 can therefore proceed as already described and based on the identity of the device, identifies a corresponding user as a potential candidate among those appearing in the image captured by ICD 110.

Optionally, NII system 100 identifies a specific individual appearing in the image by identifying a specific device held by, worn by, or adjacent to the specific individual. NII system 100 can include device identifier 214, which includes machine learning (ML) model 216. ML model 216 is trained to identify objects (e.g., smartphone, smartwatch, laptop) within captured images. For example, ML model 216 can comprise a convolutional neural network (CNN), which is a specific type of feed-forward neural network particularly well-suited for image processing. Captured connectivity data can include, for example, a device serial number or other data in addition to a UID. The additional data can specify, for example, that the device corresponding to the UID is a particular make, model, and or color. Device identifier 214 by correlating connectivity data associated with a specific device and an individual identity associated with the connectivity data can identify someone in an image who is carrying, wearing, or positioned adjacent a device having the specific characteristics (e.g., make, model, color) indicated, the device being the object identified by ML model 216. Generator 208, accordingly, can tag the image identifying the specific individual appearing in the image with the identified with the device.

Figure 3:
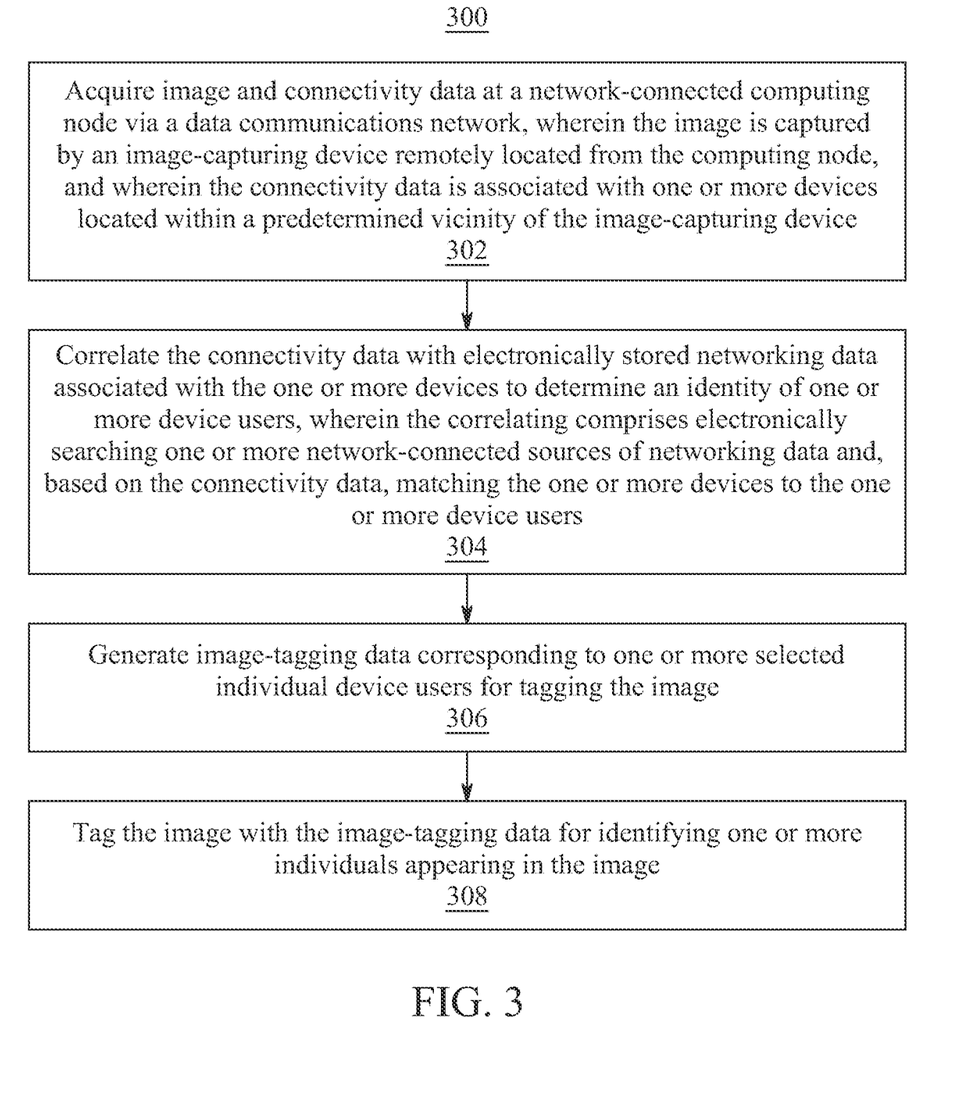
FIG. 3 is a flowchart of an example method of non-intrusive image identification of according to an embodiment.

FIG. 3 is a flowchart of example method 300 for non-intrusive image identification according to an embodiment. Method 300 can be performed by the same or similar systems as described with reference to FIGS. 1 and 2. The system at 302 electronically acquires an image and connectivity data at a network-connected computing node via a data communications network. The image is captured by an image-capturing device remotely located from the computing node. The connectivity data is associated with one or more devices located within a predetermined vicinity of the image-capturing device.

At block 304, the system correlates the connectivity data with electronically stored networking data associated with the one or more devices to determine an identity of one or more device users. The correlating comprises electronically searching one or more network-connected sources of networking data and, based on the connectivity data, matching the one or more devices to the one or more device users.

At block 306, the system generates image-tagging data which corresponds to one or more selected individual device users, and at block 308 the system tags the image with the image-tagging data for identifying one or more individuals appearing in the image.

The system can electronically convey to a user of the image-capturing device, via the data communications network, identifying data that is associated with the one or more device users. The system can select one or more individual device users for identifying by tagging the image based on a response of the user of the image-capturing device.

In some embodiments, the one or more selected individual devices users can be selected based on relationship data stored on the one or more network-connected sources of networking data. The one or more selected individual device users, in other embodiments, can be selected based on signal strengths of signals generated by the one or more devices and sensed by the image-capturing device. In still other embodiments, the one or more selected individual device users can be selected based on geolocation data generated by the one or more devices and image-capturing device.

Optionally, in some embodiments, a device in the vicinity of the image-capturing device can broadcast or respond to electronic polling with an anonymity indicator associated with an anonymous user of a device. The anonymity indicator can correspond to connectivity data (e.g., MAC address or other UID) for a specific device stored electronically on a consensual blockchain ledger. If the user of the image-capturing device has previously been granted access to the consensual blockchain ledger, the system determines the identity of the device based on connectivity data stored on the consensual blockchain ledger and corresponding to the anonymity indicator.

In still other embodiments, the system optionally identifies a specific individual appearing in the image by identifying a specific device held by, worn by, or adjacent to the specific individual. The system identifies the device using a machine learning model trained to identify objects within images. With the specific device identified, the system correlates connectivity data associated with the specific device. For example, the connectivity data can identify the make, model, and/or color of the device, and the system can identify the specific individual in the image based on the connectivity data.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
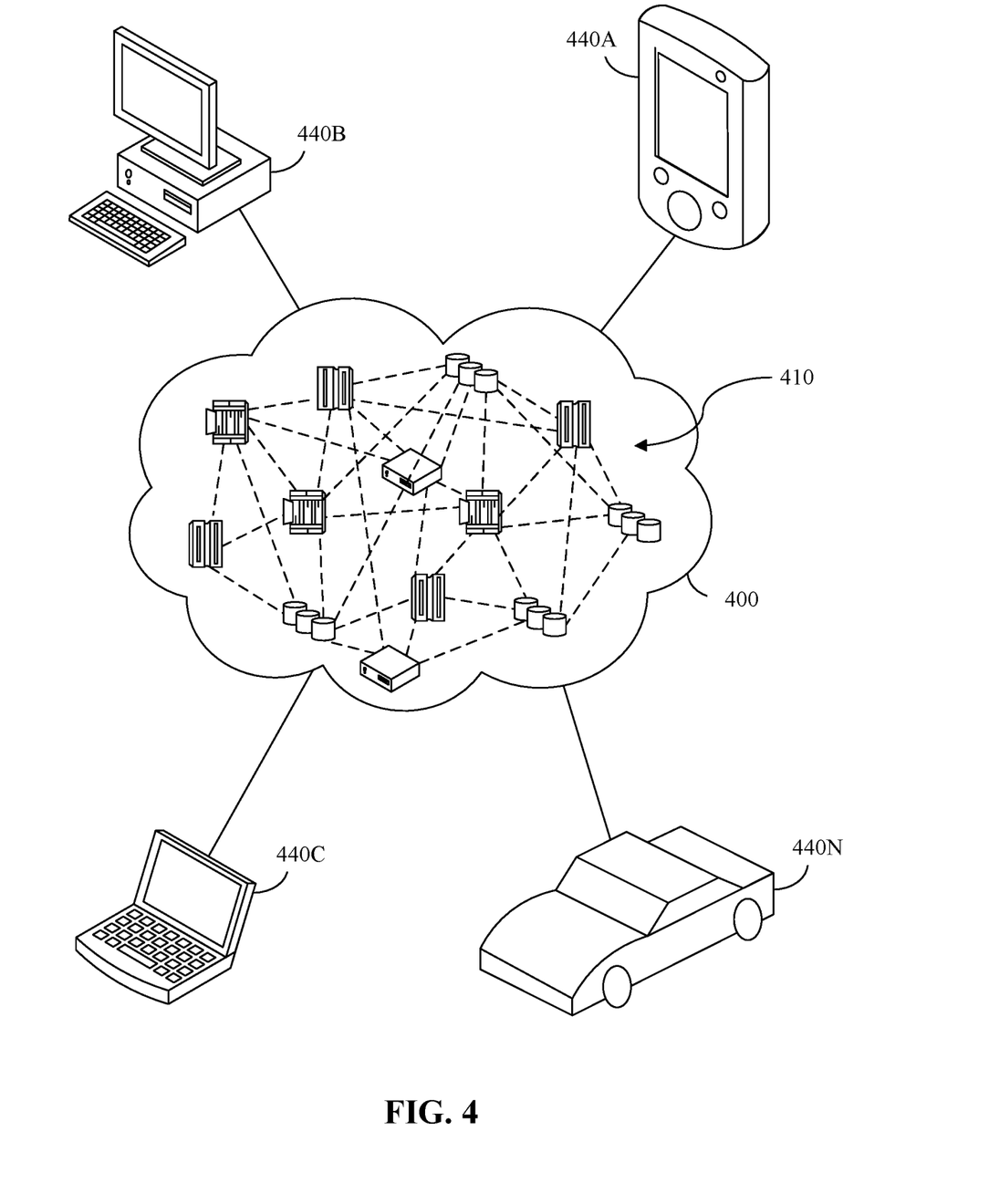
FIG. 4 depicts a cloud computing environment according to an embodiment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Computing nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440a-n shown in FIG. 4 are intended to be illustrative only and that computing nodes 410 and cloud computing environment 400 can communicate with any type of computerized device over any type of network and/or network addressable connection (e.g., using a web browser).

Figure 5:
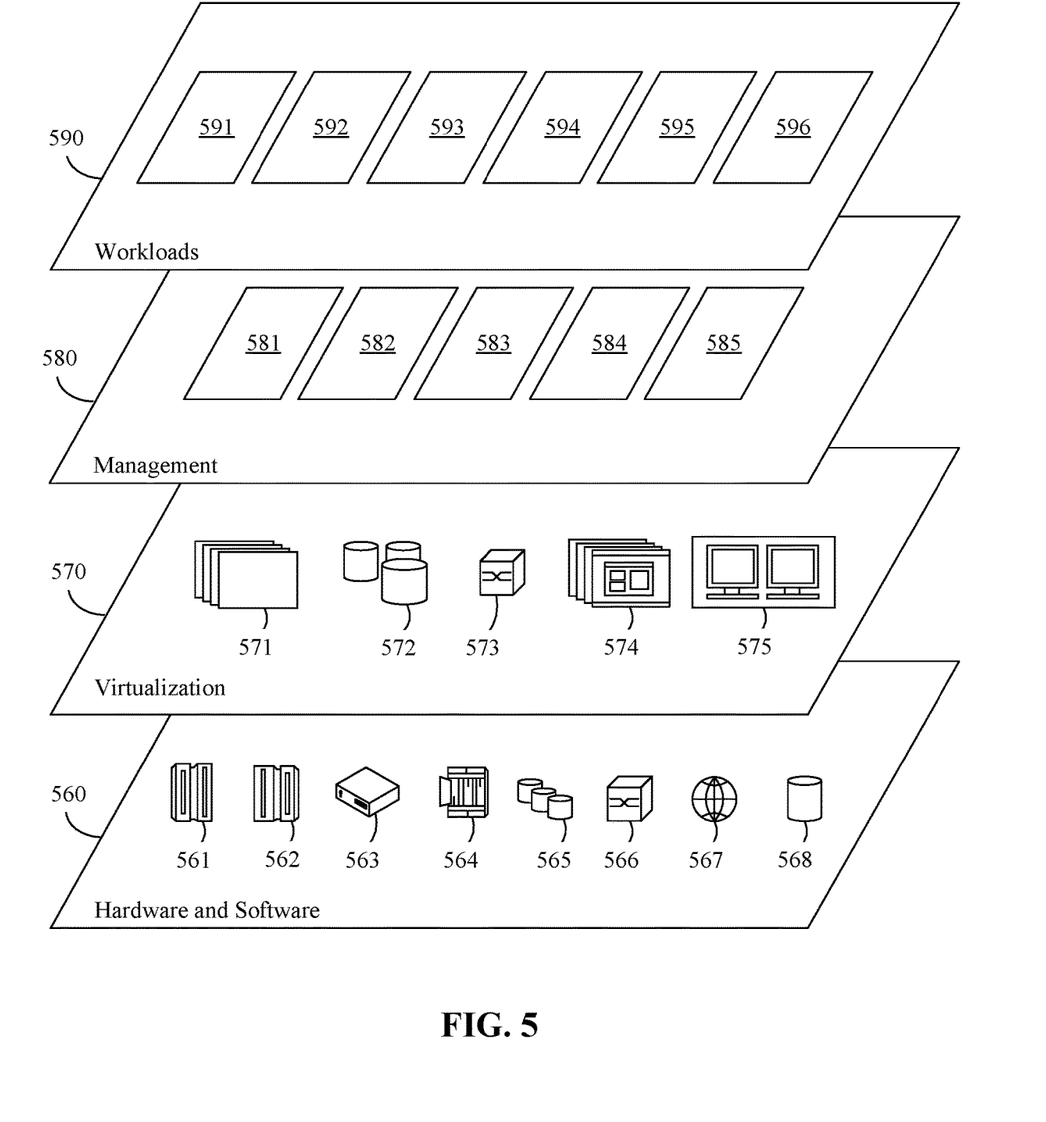
FIG. 5 depicts abstraction model layers according to an embodiment.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and NII system 596.

FIG. 6 illustrates a schematic of an example of a computing node 600. In one or more embodiments, computing node 600 is an example of a suitable cloud computing node. Computing node 600 is not intended to suggest any limitation as to the scope of use or functionality of embodiments of the invention described herein. Computing node 600 is capable of performing any of the functionality described within this disclosure.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include NII system 596 or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

FIG. 7 illustrates an example portable device 700 in accordance with one or more embodiments described within this disclosure. Portable device 700 can include a memory 702, one or more processors 704 (e.g., image processors, digital signal processors, data processors), and interface circuitry 706.

In one aspect, memory 702, processor(s) 704, and/or interface circuitry 706 are implemented as separate components. In another aspect, memory 702, processor(s) 704, and/or interface circuitry 706 are integrated in one or more integrated circuits. The various components of portable device 700 can be coupled, for example, by one or more communication buses or signal lines (e.g., interconnects and/or wires). In one aspect, memory 702 may be coupled to interface circuitry 706 via a memory interface (not shown).

Sensors, devices, subsystems, and/or input/output (I/O) devices can be coupled to interface circuitry 706 to facilitate the functions and/or operations described herein, including the generation of sensor data. The various sensors, devices, subsystems, and/or I/O devices may be coupled to interface circuitry 706 directly or through one or more intervening I/O controllers (not shown).

For example, location sensor 710, light sensor 712, and proximity sensor 714 can be coupled to interface circuitry 706 to facilitate orientation, lighting, and proximity functions, respectively, of portable device 700. Location sensor 710 (e.g., a GPS receiver and/or processor) can be connected to interface circuitry 706 to provide geo-positioning sensor data. Electronic magnetometer 718 (e.g., an integrated circuit chip) can be connected to interface circuitry 706 to provide sensor data that can be used to determine the direction of magnetic North for purposes of directional navigation. Accelerometer 720 can be connected to interface circuitry 706 to provide sensor data that can be used to determine change of speed and direction of movement of a device in three dimensions. Altimeter 722 (e.g., an integrated circuit) can be connected to interface circuitry 706 to provide sensor data that can be used to determine altitude. Voice recorder 724 can be connected to interface circuitry 706 to store recorded utterances.

Camera subsystem 726 can be coupled to an optical sensor 728. Optical sensor 728 can be implemented using any of a variety of technologies. Examples of optical sensor 728 include a charged coupled device (CCD), a complementary metal-oxide semiconductor (CMOS) optical sensor, and the like. Camera subsystem 726 and optical sensor 728 can be used to facilitate camera functions, such as recording images and/or video clips (hereafter "image data"). In one aspect, image data is a subset of sensor data.

Communication functions can be facilitated through one or more wireless communication subsystems 730. Wireless communications subsystem(s) 730 can include radio frequency receivers and transmitters, optical (e.g., infrared) receivers and transmitters, and so forth. The specific design and implementation of wireless communication subsystem(s) 730 can depend on the specific type of portable device 700 implemented and/or the communication network(s) over which portable device 700 is intended to operate.

For purposes of illustration, wireless communication subsystem(s) 730 may be designed to operate over one or more mobile networks (e.g., GSM, GPRS, EDGE), a Wi-Fi network that may include a WiMax network, a short-range wireless network (e.g., a Bluetooth network), and/or any combination of the foregoing. Wireless communication subsystem(s) 730 can implement hosting protocols such that portable device 700 can be configured as a base station for other wireless devices.

Audio subsystem 732 can be coupled to a speaker 734 and a microphone 736 to facilitate voice-enabled functions, such as voice recognition, voice replication, digital recording, audio processing, and telephony functions. Audio subsystem 732 is able to generate audio type sensor data. In one or more embodiments, microphone 736 may be utilized as a respirator sensor.

I/O devices 738 can be coupled to interface circuitry 706. Examples of I/O devices 738 include, for example, display devices, touch-sensitive display devices, track pads, keyboards, pointing devices, communication ports (e.g., USB ports), network adapters, buttons or other physical controls, and so forth. A touch-sensitive device such as a display screen and/or a pad is configured to detect contact, movement, breaks in contact, and the like using any of a variety of touch sensitivity technologies. Example touch-sensitive technologies include, for example, capacitive, resistive, infrared, and surface acoustic wave technologies, other proximity sensor arrays or other elements for determining one or more points of contact with a touch-sensitive device, and the like. One or more of I/O devices 738 may be adapted to control functions of sensors, subsystems, and such of portable device 700.

Portable device 700 further includes a power source 740. Power source 740 able to provide electrical power to various elements of portable device 700. In one embodiment, power source 740 is implemented as one or more batteries. The batteries may be implemented using any of a variety of different battery technologies, whether disposable (e.g., replaceable) or rechargeable. In another embodiment, power source 740 is configured to obtain electrical power from an external source and provide power (e.g., DC power) to the elements of portable device 700. In the case of a rechargeable battery, power source 740 further may include circuitry that is able to charge the battery or batteries when coupled to an external power source.

Memory 702 can include random access memory (e.g., volatile memory) and/or non-volatile memory, such as one or more magnetic disk storage devices, one or more optical storage devices, flash memory, and so forth. Memory 702 can store operating system 752, such as LINUX, UNIX, a mobile operating system, an embedded operating system, and the like. Operating system 752 may include instructions for handling system services and for performing hardware-dependent tasks.

Memory 702 may store additional program code 754. Examples of other program code 754 may include instructions to facilitate communicating with one or more additional devices, one or more computers, and/or one or more servers; graphic user interface processing; processing instructions to facilitate sensor-related functions; phone-related functions; electronic messaging-related functions; Web browsing-related functions; media processing-related functions; GPS and navigation-related functions; security functions; camera-related functions, including Web camera and/or Web video functions; and so forth. Memory 702 may also store one or more other applications 762.

The various types of instructions and/or program code described are provided for purposes of illustration and not limitation. The program code may be implemented as separate software programs, procedures, or modules. Memory 702 can include additional instructions or fewer instructions. Moreover, various functions of portable device 700 may be implemented in hardware and/or software, including in one or more signal processing and/or application-specific integrated circuits.

Program code stored within memory 702 and any data used, generated, and/or operated on by portable device 700 are functional data structures that impart functionality to a device when employed as part of the device. Further examples of functional data structures include, for example, sensor data, data obtained via user input, data obtained via querying external data sources, baseline information, and so forth. The term "data structure" refers to a physical implementation of a data model's organization of data within a physical memory. As such, a data structure is formed of specific electrical or magnetic structural elements within a memory. A data structure imposes physical organization on the data stored in the memory that is used by a processor.

In certain embodiments, one or more of the various sensors and/or subsystems described with reference to portable device 700 may be separate devices that are coupled or communicatively linked to portable device 700 through wired or wireless connections. For example, one or more (or all) of location sensor 710, light sensor 712, proximity sensor 714, gyroscope 716, magnetometer 718, accelerometer 720, altimeter 722, voice recorder 724, camera subsystem 726, audio subsystem 732, and so forth may be implemented as separate systems or subsystems that operatively couple to portable device 700 by way of I/O devices 738 and/or wireless communication subsystem(s) 730.

Portable device 700 can include fewer components than those shown or include additional components other than those shown in FIG. 7 depending on the specific type of system that is implemented. Additionally, the particular operating system and/or other program code 754 and/or other application(s) 756 included may also vary according to system type. Moreover, one or more of the illustrative components can be incorporated into, or otherwise form a portion of, another component. For example, a processor may include at least some memory.

Portable device 700 is provided for purposes of illustration and not limitation. A device and/or system configured to perform the operations described herein may have a different architecture than illustrated in FIG. 7. The architecture may be a simplified version of portable device 700 and may include a processor and memory storing instructions. The architecture may include one or more sensors as described herein. Portable device 700, or a similar system, can collect data using the various sensors of the device or sensors coupled thereto. It should be appreciated, however, that portable device 700 may include fewer sensors or other additional sensors. With this disclosure, data generated by a sensor is referred to as "sensor data."

Example implementations of portable device 700 include, for example, a smartphone or other mobile device or phone, a wearable computing device (e.g., smartwatch), a dedicated medical device or other suitable handheld, wearable, or comfortably carriable electronic device, capable of sensing and processing sensor-detected signals and data. It will be appreciated that embodiments can be deployed as a stand-alone device or deployed as multiple devices in a distributed client-server networked system. For example, in certain embodiments, a smartwatch can operatively couple to a mobile device (e.g., smartphone). The mobile device may or may not be configured to interact with a remote server and/or computer system.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    acquiring an image and connectivity data at a network-connected computing node via a data communications network, wherein the image is captured by an image-capturing device remotely located from the computing node, and wherein the connectivity data is associated with one or more devices located within a predetermined vicinity of the image-capturing device;
    correlating the connectivity data with electronically stored networking data associated with the one or more devices to determine an identity of one or more device users, wherein the correlating comprises electronically searching one or more network-connected sources of networking data and, based on the connectivity data, matching the one or more devices to the one or more device users;
    generating image-tagging data corresponding to one or more selected individual device users; and
    tagging the image with the image-tagging data for identifying one or more individuals appearing in the image.

2. The method of claim 1, further comprising electronically conveying to a user of the image-capturing device via the data communications network identifying data associated with the one or more device users and selecting the one or more selected individual devices users based on a response of the user of the image-capturing device.

3. The method of claim 1, further comprising selecting the one or more selected individual devices users based on relationship data stored on the one or more network-connected sources of networking data.

4. The method of claim 1, further comprising selecting the one or more selected individual devices users based on signal strengths of signals generated by the one or more devices and sensed by the image-capturing device.

5. The method of claim 1, further comprising selecting the one or more selected individual devices users based on geolocation data generated by the one or more devices and image-capturing device.

6. The method of claim 1, further comprising electronically conveying to the image-capturing device an anonymity indicator associated with one of the one or more devices, wherein responsive to the user of the image-capturing device having access to a consensual blockchain ledger the identity of the device is determined based on connectivity data stored in the consensual blockchain ledger and corresponding to the anonymity indicator.

7. The method of claim 1, further comprising identifying a specific individual appearing in the image by identifying a specific device held by, worn by, or adjacent to the specific individual using a machine learning model trained to identify objects within images and correlating connectivity data associated with the specific device.

8. A system, comprising:
    a processor configured to initiate operations including:
        acquiring an image and connectivity data at a network-connected computing node via a data communications network, wherein the image is captured by an image-capturing device remotely located from the computing node, and wherein the connectivity data is associated with one or more devices located within a predetermined vicinity of the image-capturing device;
        correlating the connectivity data with electronically stored networking data associated with the one or more devices to determine an identity of one or more device users, wherein the correlating comprises electronically searching one or more network-connected sources of networking data and, based on the connectivity data, matching the one or more devices to the one or more device users;
        generating image-tagging data corresponding to one or more selected individual device users; and
        tagging the image with the image-tagging data for identifying one or more individuals appearing in the image.

9. The system of claim 8, wherein the processor is configured to initiate further operations including electronically conveying to a user of the image-capturing device via the data communications network identifying data associated with the one or more device users and selecting the one or more selected individual devices users based on a response of the user of the image-capturing device.

10. The system of claim 8, wherein the processor is configured to initiate further operations including selecting the one or more selected individual devices users based on relationship data stored on the one or more network-connected sources of networking data.

11. The system of claim 8, wherein the processor is configured to initiate further operations including selecting the one or more selected individual devices users based on signal strengths of signals generated by the one or more devices and sensed by the image-capturing device.

12. The system of claim 8, wherein the processor is configured to initiate further operations including selecting the one or more selected individual devices users based on geolocation data generated by the one or more devices and image-capturing device.

13. The system of claim 8, wherein the processor is configured to initiate further operations including electronically conveying to the image-capturing device an anonymity indicator associated with one of the one or more devices, wherein responsive to the user of the image-capturing device having access to a consensual blockchain ledger the identity of the device is determined based on connectivity data stored in the consensual blockchain ledger and corresponding to the anonymity indicator.

14. A computer program product, the computer program product comprising:
one or more computer-readable storage media and program instructions collectively stored on the one or more computer-readable storage media, the program instructions executable by a processor to cause the processor to initiate operations including:
acquiring an image and connectivity data at a network-connected computing node via a data communications network, wherein the image is captured by an image-capturing device remotely located from the computing node, and wherein the connectivity data is associated with one or more devices located within a predetermined vicinity of the image-capturing device;
correlating the connectivity data with electronically stored networking data associated with the one or more devices to determine an identity of one or more device users, wherein the correlating comprises electronically searching one or more network-connected sources of networking data and, based on the connectivity data, matching the one or more devices to the one or more device users;
generating image-tagging data corresponding to one or more selected individual device users; and
tagging the image with the image-tagging data for identifying one or more individuals appearing in the image.

15. The computer program product of claim 14, wherein the program instructions are executable by the processor to cause the processor to initiate operations further comprising electronically conveying to a user of the image-capturing device via the data communications network identifying data associated with the one or more device users and selecting the one or more selected individual devices users based on a response of the user of the image-capturing device.

16. The computer program product of claim 14, wherein the program instructions are executable by the processor to cause the processor to initiate operations further comprising selecting the one or more selected individual devices users based on relationship data stored on the one or more network-connected sources of networking data.

17. The computer program product of claim 14, wherein the program instructions are executable by the processor to cause the processor to initiate operations further comprising selecting the one or more selected individual devices users based on signal strengths of signals generated by the one or more devices and sensed by the image-capturing device.

18. The computer program product of claim 14, wherein the program instructions are executable by the processor to cause the processor to initiate operations further comprising selecting the one or more selected individual devices users based on geolocation data generated by the one or more devices and image-capturing device.

19. The computer program product of claim 14, wherein the program instructions are executable by the processor to cause the processor to initiate operations further comprising electronically conveying to the image-capturing device an anonymity indicator associated with one of the one or more devices, wherein responsive to the user of the image-capturing device having access to a consensual blockchain ledger the identity of the device is determined based on connectivity data stored in the consensual blockchain ledger and corresponding to the anonymity indicator.

20. The computer program product of claim 14, wherein the program instructions are executable by the processor to cause the processor to initiate operations further comprising identifying a specific individual appearing in the image by identifying a specific device held by, worn by, or adjacent to the specific individual using a machine learning model trained to identify objects within images and correlating connectivity data associated with the specific device.

* * * * *